C. S. MORSE.
RESILIENT TIRE.
APPLICATION FILED OCT. 6, 1913.
1,133,170.
Patented Mar. 23, 1915.
3 SHEETS—SHEET 2.
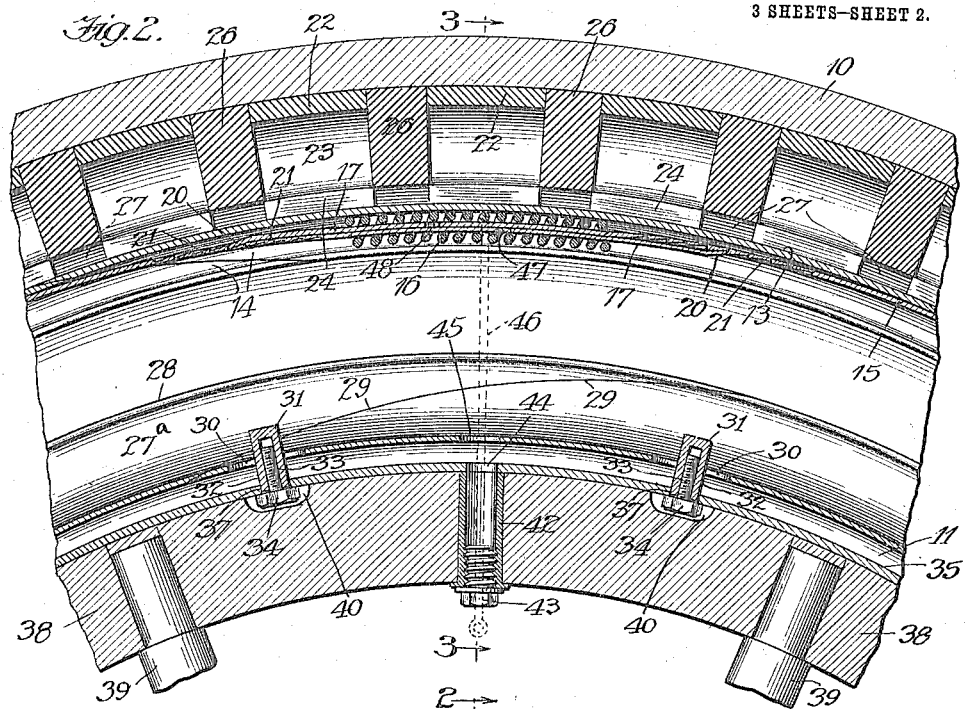
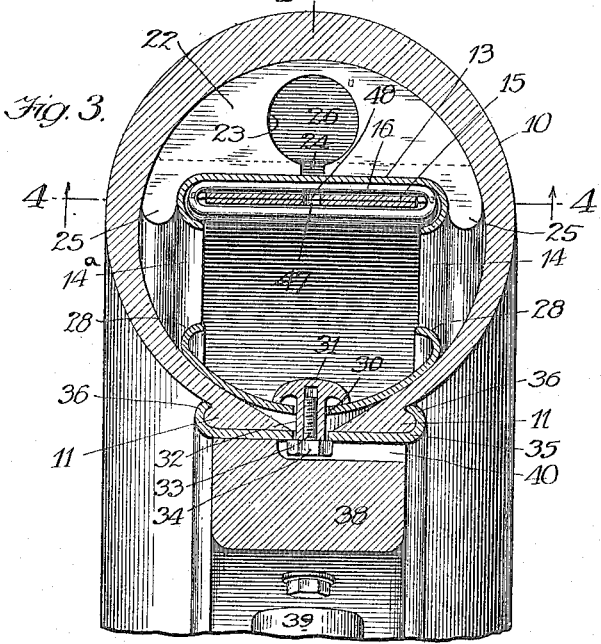
Witnesses
Martin H. Olsen
F. C. Dyer
Inventor
Clyde S. Morse
By Chas. C. Tillman
Atty.

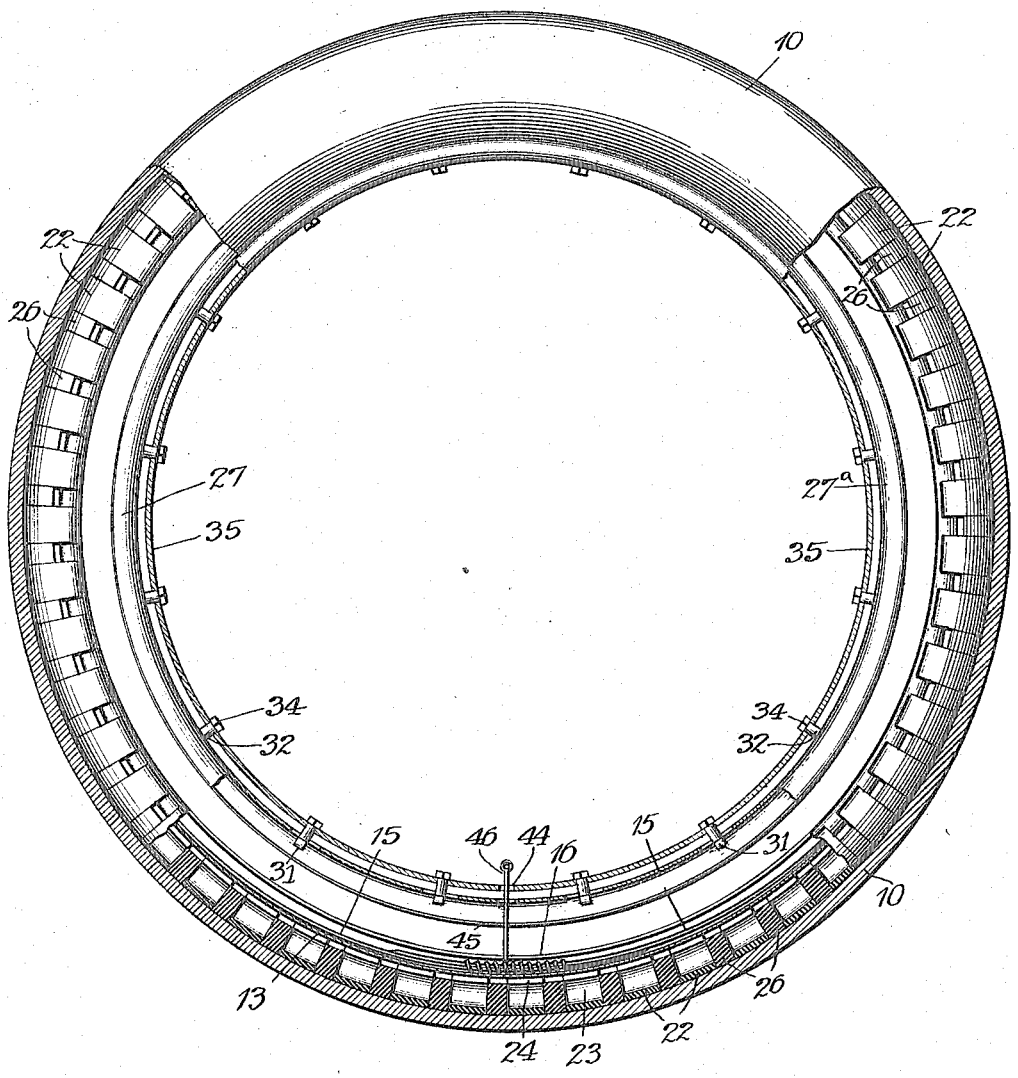

C. S. MORSE.
RESILIENT TIRE.
APPLICATION FILED OCT. 6, 1913.
1,133,170.
Patented Mar. 23, 1915.
3 SHEETS—SHEET 3.
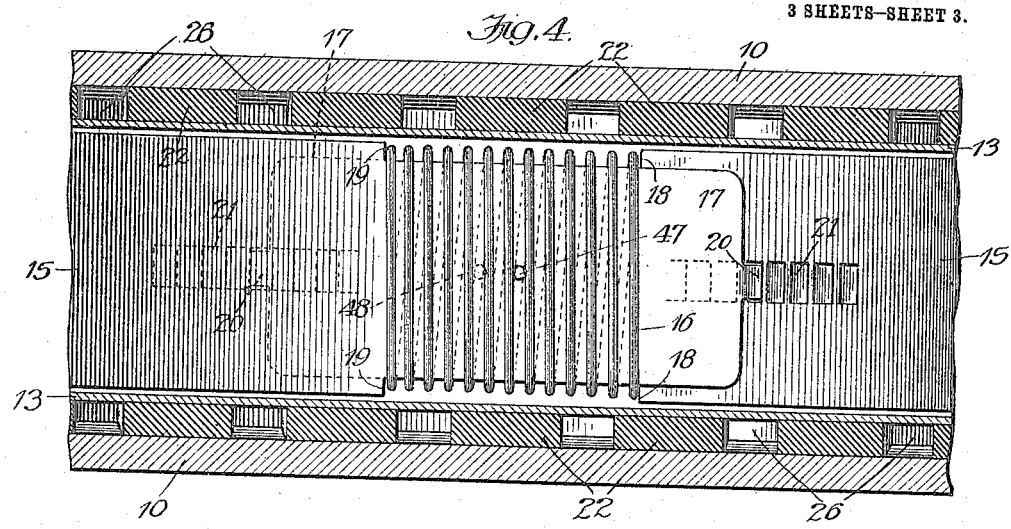
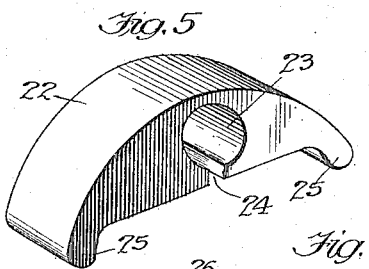
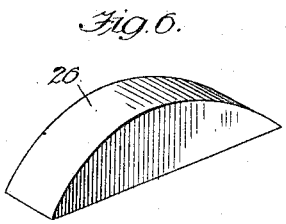
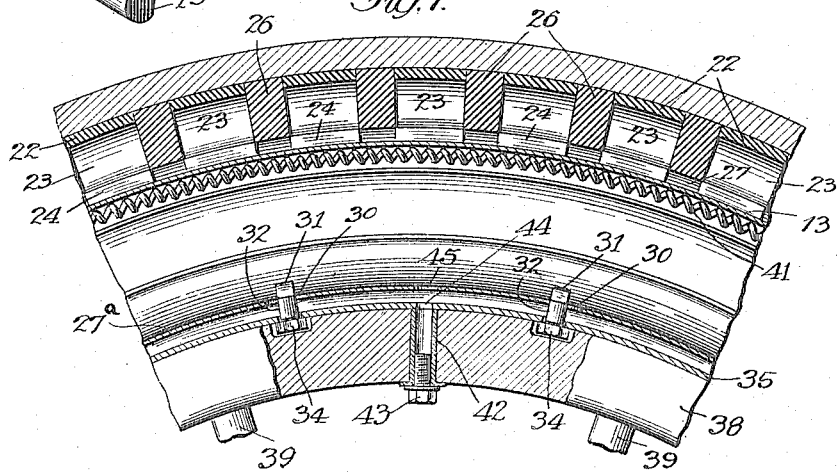
Witnesses
Martin H. Olsen
F. C. Dyer
Inventor
Clyde S. Morse
By Chas. C. Tillman
Atty.

UNITED STATES PATENT OFFICE.

CLYDE S. MORSE, OF DE KALB, ILLINOIS.

RESILIENT TIRE.

1,133,170. Specification of Letters Patent. Patented Mar. 23, 1915.

Application filed October 6, 1913. Serial No. 793,542.

*To all whom it may concern:*

Be it known that I, CLYDE S. MORSE, a citizen of the United States, residing at De Kalb, in the county of Dekalb, State of Illinois, have invented certain new useful Improvements in Resilient Tires, of which the following is a specification.

This invention relates to improvements in resilient tires, and while it is more particularly intended for use on the wheels of automobiles yet it is applicable for use on the wheels of other vehicles of various kinds, and it consists in certain peculiarities of the construction, novel arrangement and operation of the various parts thereof, as will be hereinafter more fully set forth and specifically claimed.

The main object of the invention is to provide a resilient tire which shall be simple and inexpensive in construction, strong, durable and efficient in service or operation and so made that its resiliency and efficiency will not be materially affected by punctures and blow outs.

Another important object of the invention is to provide a resilient tire of such construction and arrangement of its parts that if desired the tire casing or tube of an ordinary pneumatic tire, whether new or used, or of high or low grade material, may be employed as one of the elements of my improved tire.

Various other objects and advantages of the invention will be disclosed in the subjoined description and explanation.

In the accompanying drawings which serve to illustrate an embodiment of the invention, Figure 1 is a side face view partly in elevation and partly in section of a resilient tire embodying one form of the invention, showing the parts thereof assembled and ready to be placed on the felly of the wheel. Fig. 2 is a greatly enlarged circumferential sectional view of a portion of the felly of a wheel, showing a part of the tire mounted thereon; said section being taken on line 2—2 of Fig. 3 looking in the direction indicated by the arrows. Fig. 3 is a cross sectional view taken on line 3—3 of Fig. 2 looking in the direction indicated by the arrows. Fig. 4 is a bottom plan view taken on line 4—4 of Fig. 3 looking in the direction indicated by the arrows. Fig. 5 is a detached perspective view of one of the chambered resilient blocks used in the construction of the tire. Fig. 6 is a similar view of another one of the resilient blocks employed in conjunction with those shown in Fig. 5; and, Fig. 7 is a circumferential sectional view of a tire and a part of the felly of the wheel showing the former mounted on the latter; said view being taken on line 2—2 of Fig. 3 looking in the direction indicated by the arrows, and showing a modification in the construction of the tire.

Corresponding numerals of reference referring to like parts throughout the different views of the drawings: The reference numeral 10 designates the casing of the tire, which casing may be of the preferred or ordinary kind such as that employed in pneumatic tires in common use, and said casing may be made of any suitable flexible material. As shown in Fig. 3 the casing 10 is split circumferentially on its inner periphery so that when in position on the felly the edges of the casing will be approximated, thus forming substantially a cylindrical tube. Near each of its edges the casing is provided with a laterally extended enlargement 11 which engage a channelled rim 35 as will be presently explained.

Located concentrically within the casing 10 is a resilient metal band 13 which has its ends beveled as at 14,—see Fig. 2—so as to overlap each other. This band as shown in Fig. 3 is provided at each of its edges with an inturned flange 14ᵃ, which flanges assist in holding in position an auxiliary and expansible band 15, and also a spring 16, which assists in the expansion of the band 15 as well as the band 13. The band 15 is broken and is provided at each of its ends with a slightly reduced portion 17 around which reduced portions the spring 16 is wound so as to rest at one of its ends against shoulders 18, and at its other end against shoulders 19 on the approximated ends of said band. Each of the extensions 17 is provided at its free end with a catch or deflected tongue 20 to engage ratchet teeth 21 formed on the surfaces of the band 15 to engage said tongue.

Interposed transversely of the casing 10, between the inner surface of the outer periphery thereof, and the band 13, are a series of chambered blocks 22, each of which is preferably made of rubber and segmental in shape as is clearly shown in Fig. 5 of the drawing. Each of the blocks 22 is provided with apertures 23 which extent transversely through the middle portion of said block. Each of the blocks 22 is provided with a transverse slot 24 which divides the lower portion of the opening 23 in the block and permits of greater resiliency thereof. Each of the blocks 22 is provided at each of its ends with an extension 25, which extensions will lie between the flanges 14 of the band 13 and the tire casing, as is clearly shown in Fig. 3 of the drawings. As shown, the blocks 22 are spaced apart and between each of said blocks is located and frictionally held thereby a movable block 26, each of which is also segmental in shape, and preferably made of resilient material such as rubber. The blocks 26 are of less size than blocks 22 so as to afford spaces 27 between the inner or straight edges thereof and the outer surface of the band 13. These movable blocks 26 close the chambers 23 or openings of the blocks 22 but do not close the slots 24 in the last named blocks. Thus it will be seen that the chambers or openings 23 will be in communication with one another through the slots 24, and as the blocks 22 and 26 are extended completely around the casing 10 and between it and the band 13 a series of chambers will be formed or provided.

Located within the casing 10 near its inner periphery is an expansible band 27ª which is preferably segmental in cross section as shown in Fig. 3, and has at each of its edges an inturned flange 28 to prevent injury to the tire casing and also to reinforce said band. The band 27ª is broken and has its ends beveled as at 29, see Fig. 2, so as to overlap each other. This band is also provided at proper intervals through its inner portion with slots 30 for the reception and retention of wing nuts 31, each of which is provided with a sleeve 32 to engage a screw bolt 33, each of which bolts has a head 34 thereon to rest against the inner periphery of a metal rim 35 which is provided at each of its edges with an inturned flange 36 to engage the extensions 11 and the approximated edges of the tire casing. The metal rim 35 is provided at proper points to register with the slots 30 in the band 27 with a series of openings 37 through which the bolts 33 are passed.

The felly 38 of the wheel may be of the ordinary construction and mounted upon spokes 39 in the usual manner, but in order to permit the band 35 to fit closely on its outer surface, said felly is provided with a series of transverse recesses 40 for the reception of the bolt heads.

In Fig. 7 of the drawing is shown a modification in the construction of the tire, which is identical in every respect with the construction above described and shown in Figs. 1 to 6 inclusive of the drawings except that the expansible band 15 is omitted and an expanding spring 41 is substituted for said expanding band. This expanding spring 41 will perform the function of the expansible band 15 and the expanding spring thereon, that is, it will assist in expanding the band 13 which supports the chambered blocks.

As is clearly shown in Figs. 2, 3, 4, and 7 of the drawings the felly 38 is provided with a tube 42 of the ordinary kind used in connection with an air pump for forcing air into pneumatic tires. This tube is shown to be closed by a screw plug 43 and connected with an opening 44 in the rim or band 35 which latter opening registers with an opening 45 in the band 27 so that a key or rod 46, after the plug 43 has been removed from the tube 42, can be inserted through said tube 42, and the openings 44 and 45, see Fig. 2, and into the openings 47 and 48 formed in the reduced portions 17 of the band 15, thus holding the said band in a slightly contracted position until the blocks 22 and 26 shall have been placed between the band 13 and the tread portion of the tire casing, after which it is apparent that the key 46 may be withdrawn, when it is apparent that the spring 16 will expand band 15 and also the band 13 so as to force the blocks 22 and 26 against the tire casing in which position they will be maintained by the action of said spring and bands. After the key 46 has been withdrawn the tube 42 may be closed by the plug 43 to exclude dust and foreign matter from the tire.

From the foregoing and by reference to the drawings it will be readily understood and clearly seen that by employing a tire embodying my improvements great efficiency, durability, resiliency and economy will be afforded, and that if the tire casing is punctured or badly cut a resilient tire will still be furnished by reason of the resilient blocks, and the air chambers or pockets provided by the same.

While I have shown and described my invention in its preferred embodiment, I do not wish to be limited to the same, nor to the details shown, since it is obvious that various shapes of blocks may be used, and numerous changes might be made in the construction and arrangement of the parts without departing from the spirit of my invention.

As there is considerable space between the band 27, spring 16, bands 13 and 15, it is apparent that an air space or cushion will be provided.

Having thus fully described my invention, what I claim is new and desire to secure as Letters Patent is—

1. In a resilient tire, the combination with a circular casing, of an expansible band located therein at a distance from the tread portion of the casing, means to expand said band, a series of chambered resilient blocks and a series of solid resilient blocks alternately located in contact with one another between said band and the tread portion of the casing, said chambered blocks having lateral extensions interposed between the sides of the casing and the sides of the band, and said solid blocks being located at a distance externally of said band.

2. In a resilient tire, the combination with a circular casing, of an expansible band located concentrically therein at a distance from the tread portion of the casing, means to expand said band, means to lock it against contraction and a series of chambered resilient blocks and a series of solid resilient blocks located in contact with one another alternately between said band and the tread portion of the casing, said chambered blocks having lateral extensions interposed between the sides of the casing and the sides of the band.

3. A resilient tire including a flexible circular casing, a resilient band located therein at a distance from the tread portion of the casing, a series of chambered resilient blocks and a series of solid resilient blocks alternately located between said band and the tread portion of the casing, said solid blocks being movable radially with respect to the casing and band and normally held by frictional engagement between the chambered blocks at a distance from the external surface of said band.

4. A resilient tire including a flexible circular casing, a resilient band located therein at a distance from the tread portion of the casing, a series of chambered resilient blocks each having a slot leading from its chamber through the inner edge of said block, and a series of solid resilient blocks alternately located between said band and the tread portion of the casing, said solid blocks being movable radially with respect to the casing and band and normally held by frictional engagement between the chambered blocks at a distance from the external surface of said band, the chambers of the chambered blocks having communication with the spaces between the solid blocks and said band.

CLYDE S. MORSE.

Witnesses:
CHAS. H. SCHERMERHORN,
JAMES McCONN, Jr.

Copies of this patent may be obtained for five cents each, by addressing the "Commissioner of Patents, Washington, D. C."